US008248778B2

(12) United States Patent
Dai

(10) Patent No.: US 8,248,778 B2
(45) Date of Patent: Aug. 21, 2012

(54) FIXING MECHANISM FOR STORAGE DEVICE

(75) Inventor: Bin Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 207 days.

(21) Appl. No.: 12/564,853

(22) Filed: Sep. 22, 2009

(65) Prior Publication Data

US 2010/0327133 A1   Dec. 30, 2010

(30) Foreign Application Priority Data

Jun. 26, 2009   (CN) .......................... 2009 1 0303750

(51) Int. Cl.
*G06F 1/16* (2006.01)
*H05K 5/00* (2006.01)
*H05K 7/00* (2006.01)

(52) U.S. Cl. ......... 361/679.37; 361/679.31; 361/679.33; 361/679.39; 248/221.11; 248/220.21; 248/220.22; 248/222.11; 312/223.2

(58) Field of Classification Search ............. 361/679.31, 361/679.33, 679.37, 679.39; 248/694, 918, 248/221.11, 222.11, 225.21, 27.1, 27.3, 220.21, 248/220.22, 222.13, 222.52, 223.41, 225.11; 312/223.2, 332.1, 218, 216; 403/326, 397, 403/DIG. 11, DIG. 14
See application file for complete search history.

(56) References Cited

U.S. PATENT DOCUMENTS

| 5,599,080 | A | * | 2/1997 | Ho ............................. 312/334.7 |
| 5,652,695 | A | * | 7/1997 | Schmitt ..................... 361/679.31 |
| 5,751,551 | A | * | 5/1998 | Hileman et al. .............. 361/753 |
| 5,943,208 | A | * | 8/1999 | Kato et al. ................. 361/679.31 |
| 6,064,567 | A | * | 5/2000 | Cheng ....................... 361/679.31 |
| 6,122,165 | A | * | 9/2000 | Schmitt et al. ........... 361/679.31 |
| 6,130,817 | A | * | 10/2000 | Flotho et al. ............. 361/679.31 |
| 6,798,652 | B2 | * | 9/2004 | Wang et al. .............. 361/679.33 |
| 7,006,351 | B2 | * | 2/2006 | Chen et al. ............... 361/679.34 |
| 7,137,767 | B2 | * | 11/2006 | Franke et al. ................. 411/401 |
| 7,382,609 | B2 | * | 6/2008 | Zhang et al. ............. 361/679.33 |
| 7,408,770 | B2 | * | 8/2008 | Peng et al. ............... 361/679.33 |
| 7,486,510 | B2 | * | 2/2009 | Han et al. ................. 361/679.33 |
| 7,495,904 | B2 | * | 2/2009 | Liang et al. .............. 361/679.39 |
| 7,667,960 | B2 | * | 2/2010 | Miyairi .................... 361/679.34 |
| 7,916,465 | B2 | * | 3/2011 | Chen ........................ 361/679.39 |
| 7,969,725 | B2 | * | 6/2011 | Dai .......................... 361/679.37 |
| 7,969,726 | B2 | * | 6/2011 | Dai .......................... 361/679.37 |
| 7,974,089 | B2 | * | 7/2011 | Dai .......................... 361/679.37 |

(Continued)

*Primary Examiner* — Terrell McKinnon
*Assistant Examiner* — Michael McDuffie
(74) *Attorney, Agent, or Firm* — Altis Law Group, Inc.

(57) ABSTRACT

A fixing mechanism includes a plurality of fixing members, a limiting member, two first supporting members extending from the bracket, two second supporting members formed in the bracket and opposite to the first supporting members, and a latching member adjacent to the second supporting members. The limiting member includes a resilient sheet and a latching portion extending from the resilient sheet. The limiting member is fixed to the storage device with the fixing members at opposite sides of the storage device. The fixing members of one side of the storage device engage with the first supporting member. The fixing members of the other side of the storage device engage with the second supporting member. The latching member is latched with the latching portion of the limiting member, such that the storage device is mounted between the first and second supporting members.

16 Claims, 5 Drawing Sheets

U.S. PATENT DOCUMENTS

| | | | |
|---|---|---|---|
| 8,004,830 B2 * | 8/2011 | Lu ............................ | 361/679.33 |
| 2007/0297129 A1 * | 12/2007 | Liu et al. ....................... | 361/685 |
| 2008/0259554 A1 * | 10/2008 | Qin et al. ...................... | 361/685 |
| 2008/0316698 A1 * | 12/2008 | Yeh et al. ...................... | 361/685 |

* cited by examiner

FIXING MECHANISM FOR STORAGE DEVICE

BACKGROUND

1. Technical Field

The present disclosure relates to fixing mechanisms, and particularly, to a fixing mechanism for a storage device.

2. Description of the Related Art

Electronic devices, such as desktop computers and servers often include storage devices, such as hard disk drives, compact disk read-only memory drives, digital video disc drives, floppy disk drives, and so on. These electronic devices are typically incorporated to increase the functionality of the electronic device as desired.

A typical fixing mechanism is used to mount a storage device to an electronic device. The electronic device, such as a host computer, can include a case having a base and a sidewall. The fixing mechanism includes a storage device holder, a fixing bracket, and a plurality of screws. The bracket is perpendicularly fixed to the base of the casing, and is separate from the sidewall. The storage device holder includes a mounting protrusion extending from a side surface thereof. The storage device holder is disposed on the base and the mounting protrusion is fixed to the bracket by the screws. The storage device is fixed in the storage device holder. However, a developing trend to miniaturize the electronic device creates insufficient space to disassemble the storage device, rendering disassembly of the storage device troublesome, along with the risk of damaging other working elements of the electronic device during such process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
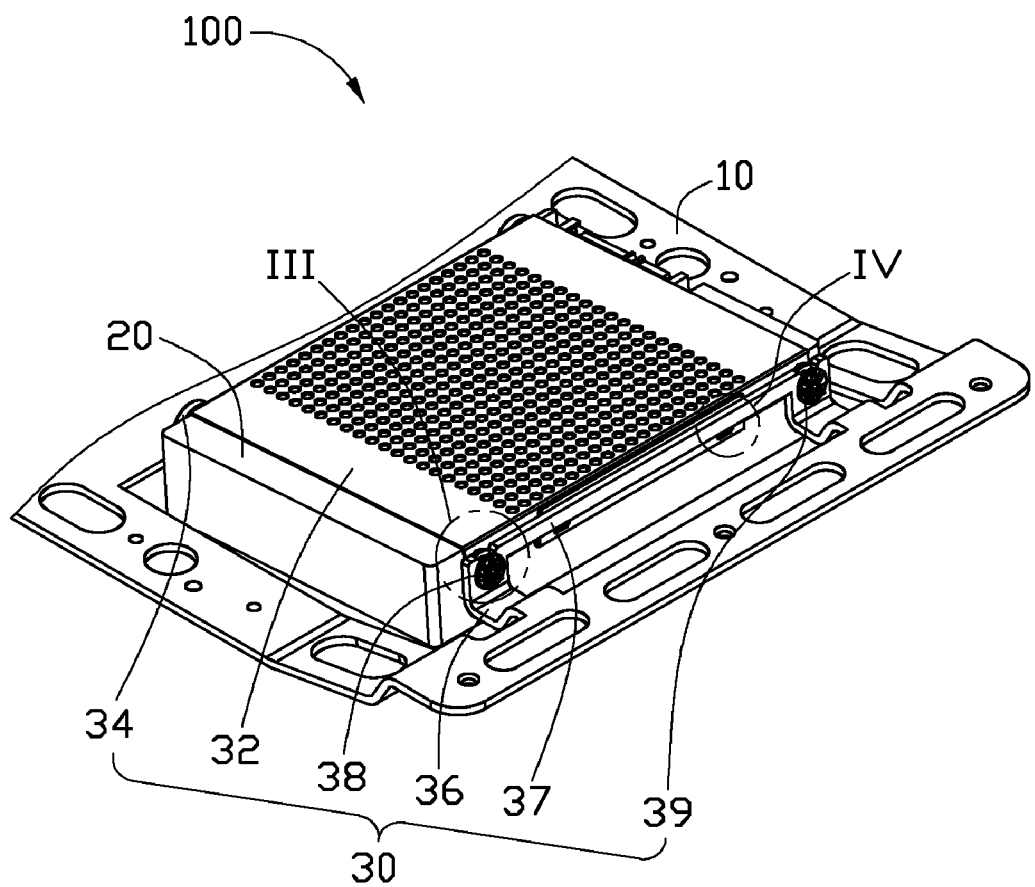
FIG. 1 is an assembled, isometric view of a first embodiment of a fixing mechanism of an electronic device.
Figure 2:
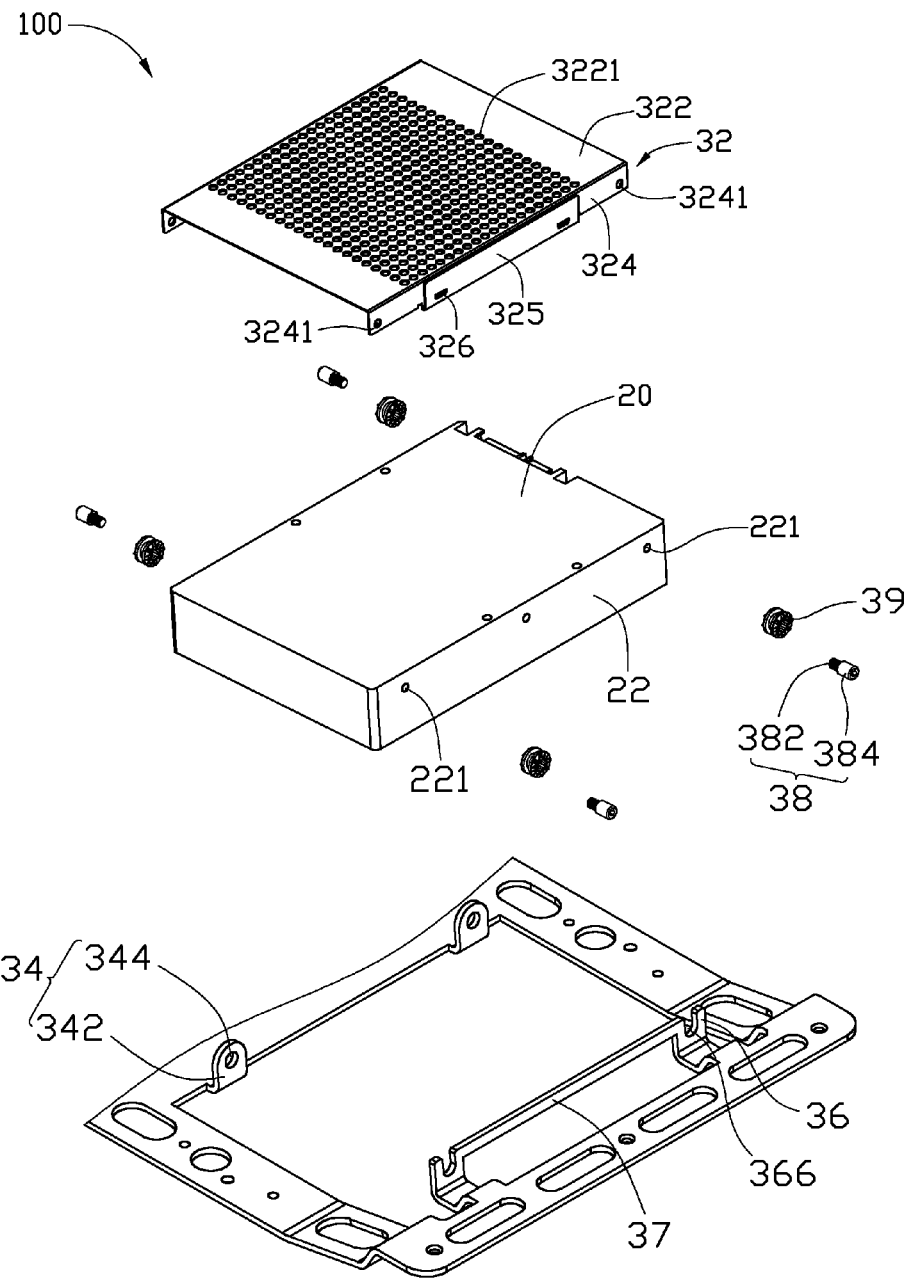
FIG. 2 is an exploded, isometric view of the fixing mechanism shown in FIG. 1.

Referring to FIGS. 1 and 2, a first embodiment of an electronic device 100 includes a bracket 10, a storage device 20, and a fixing mechanism 30 fixing the storage device 20 to the bracket 10. In the illustrated embodiment, the electronic device 100 is a host computer, but can be any device employing a storage device, such as a television set or a handheld game console.

In the illustrated embodiment, the storage device 20 is a hard-disk drive, substantially cubic, and includes two positioning sides 22 opposite to each other. Each of the positioning sides 22 defines a pair of fixing holes 221 opposite to each other.

The fixing mechanism 30 includes a limiting member 32, two first supporting members 34, two second supporting members 36, a latching member 37, and two pairs of fixing members 38. The two first supporting members 34 extend out from the bracket 10 and are spaced from each other. The two second supporting members 36 extend out from the bracket 10, and correspond to the two first supporting members 34. The latching member 37 is a bridge connecting with the two second supporting members 36. The two pairs of fixing members 38 fix the limiting member 32 to the storage device 20.

The limiting member 32 is substantially U-shaped, and includes a main board 322, two side plates 324, a resilient sheet 325 and two latching portions 326. The two side plates 324 extend substantially perpendicularly from opposite edges of the main board 322. Each of the side plates 324 defines two through holes 3241 in opposite ends thereof. The two pairs of fixing members 36 engage with the storage device 20 through the corresponding through holes 3241. The resilient sheet 325 extends from an edge of one of the two side plates 324 between the two through holes 3241, and bends substantially parallel to the corresponding side plate 324. Each of the latching portions 326 is a protrusion extending from an outer surface of the resilient sheet 325. The main board 322 further defines a plurality of dissipating holes 3221 to dissipate heat from the storage device 20.

Each of the first supporting members 34 includes a sheet body 342 and a through hole 344. The sheet body 342 extends substantially perpendicularly from the bracket 10. The through hole 344 is defined in a middle portion of the sheet body 342. Each of the second supporting members 36 includes a sheet body 362 and a latching groove 366. The sheet body 362 extends substantially perpendicularly from the bracket 10. The latching groove 366 is defined in a top of the sheet body 362 away from the bracket 10.

Figure 3:
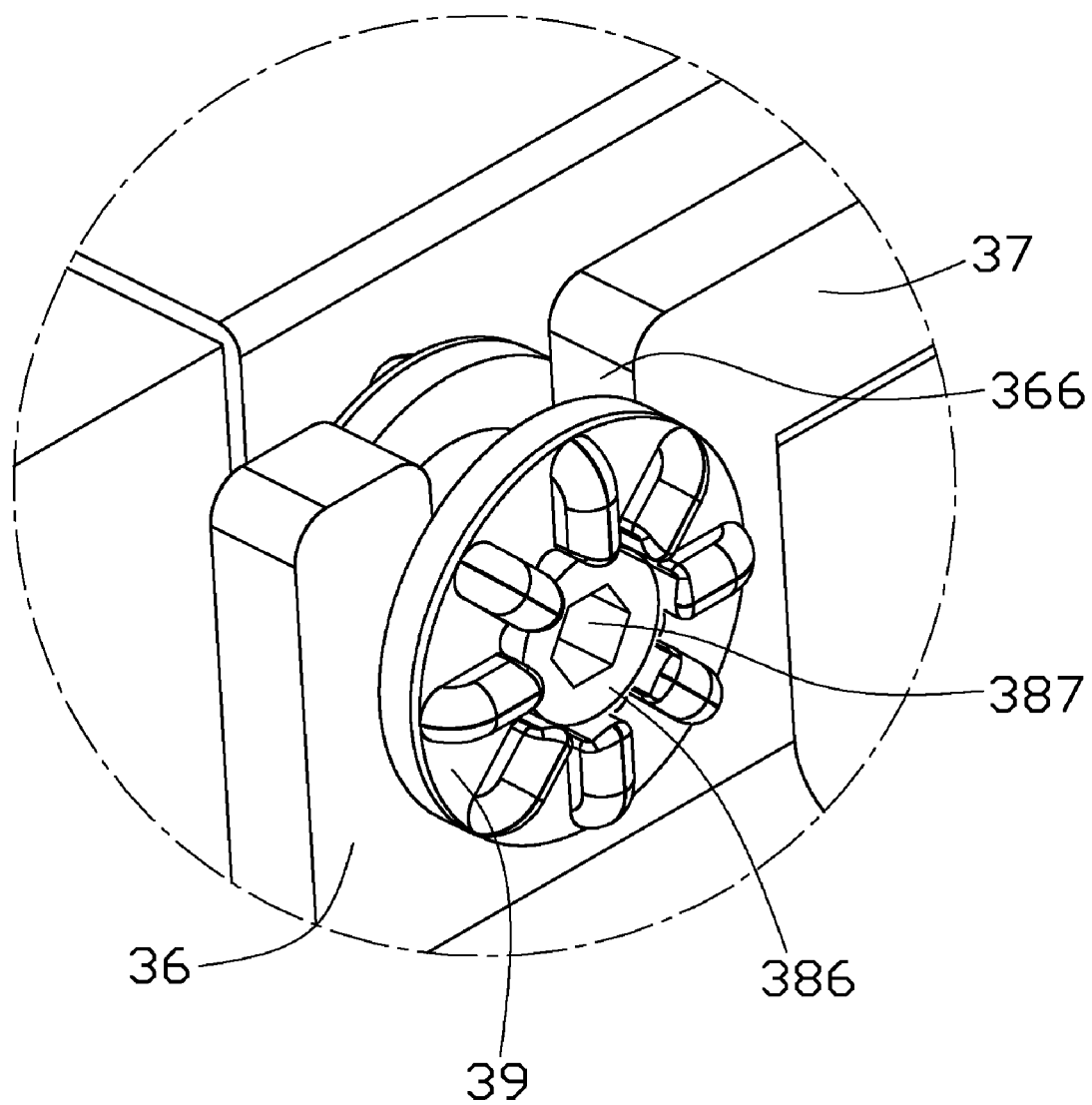
FIG. 3 is an enlarged view of circular part III of FIG. 1.

In the illustrated embodiment, each of the fixing members 38 includes a threaded portion 382 and a head portion 384 extending from an end of the threaded portion 382. The threaded portions 382 of the fixing members 38 may engage in the corresponding fixing holes 221 of the storage device 20. The head portions 384 of one pair of the fixing member 38 engage in the through holes 344 of the two first supporting members 34. The head portions 384 of the other pair of fixing member 38 engage in the corresponding latching grooves 366 of the two second supporting members 36. Referring to FIG. 3, the head portion 384 can define a key 387 in an end surface of the head portion 384 away from the threaded portion 382. The key 387 is easily engaged by a screwdriver to assemble or disassemble the fixing members 38. The fixing members 38 can be, but are not limited to, screws. For example, the head portion 384 can be a head of a socket head cap screw.

The fixing mechanism 30 further includes two pairs of rubber gaskets 39. One pair of rubber gaskets 39 is sleeved on the corresponding head portions 384 of the fixing members 38. The other pair of rubber gaskets 39 is received in the corresponding through holes 344 of the first supporting members 34. The two pairs of rubber gaskets 39 are configured to absorb shock to the storage device 20.

Figure 4:
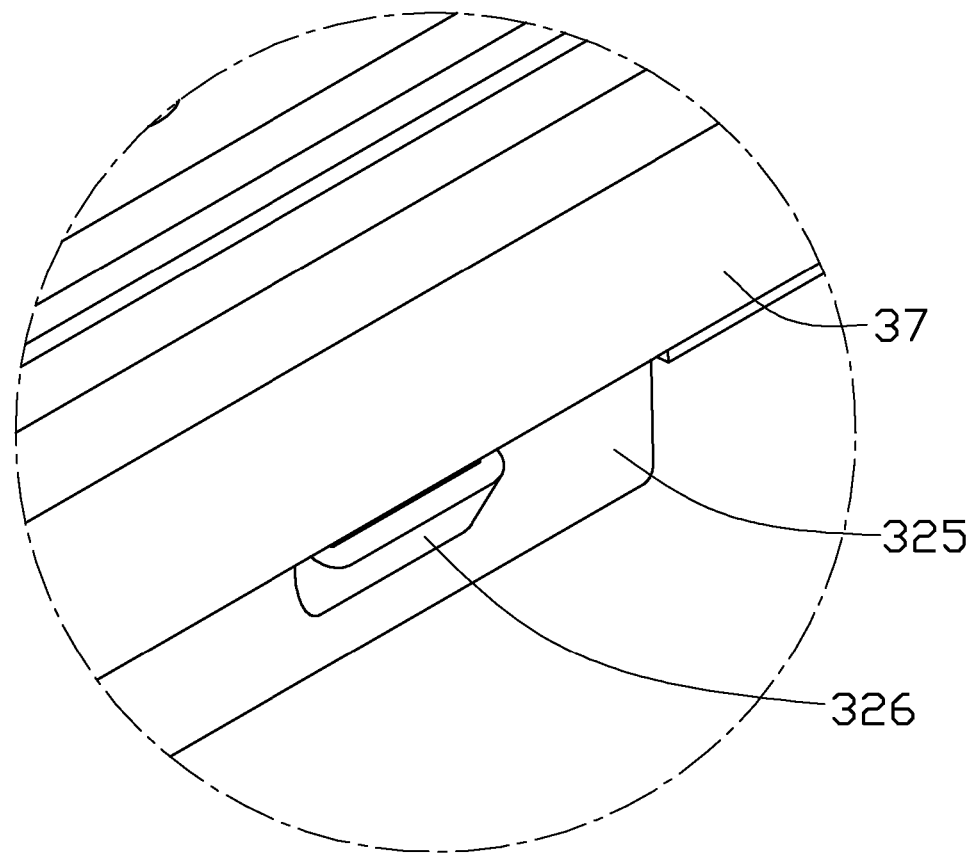
FIG. 4 is an enlarged view of circular part IV of FIG. 1.

Referring to FIGS. 2 through 4, the storage device 20 is fixed to the bracket 10 as follows. The limiting member 32 is placed on the storage device 20. The two pairs of fixing members 36 pass through the through holes 3241 of the limiting members 32, and engage in the fixing holes 221 of the storage device 20 correspondingly, to fix the storage device 20 between the pair of side plates 324 of the limiting member 32. The head portions 384 of one pair of the fixing members 38 adjoining the resilient portion 325 of the limiting member 32 are sleeved on the rubber gaskets 39 and the latching grooves 366 of the two second supporting members 36. The head portions 384 of the other pair of fixing members 38 engage in the through holes 344 of the first supporting members 34 with the rubber gaskets 39. The two latching portions 326 of the limiting member 32 engage with the latching member 37 by deformation of the resilient sheet 325. Thus, the storage device 20 is fixed to the bracket 10.

The storage device 20 can be detached from the bracket 10 as follows. The resilient sheet 325 are impelled toward the side plates 324, such that the resilient sheet 325 deforms to allow the two latching portions 326 to detach from the latching members 37. The head portions 384 of one pair of the fixing members 38 adjoining the resilient 325 of the limiting member 32 with the rubber gaskets 39 detach from the latching grooves 366 of the two second supporting members 36. The head portions 384 of the other pair of fixing members 38 detach from the rubber gaskets 39 received in the through holes 344 of the first supporting members 34. Thus, the storage device 20 with the limiting member 32 is disassembled from the bracket 10. Both assembly and disassembly of the storage device 20 to and from the bracket 10 are easily accomplished, and structure of the fixing mechanism 30 is simplified.

It is to be understood that the main board 322 and the two side plates 324 can also be omitted, wherein the resilient sheet 325 is fixedly disposed in a sidewall of the storage device 20. The latching portion 326 can also be a hook extending from an edge of the resilient sheet 325 and engaging the latching member 37.

Figure 5:
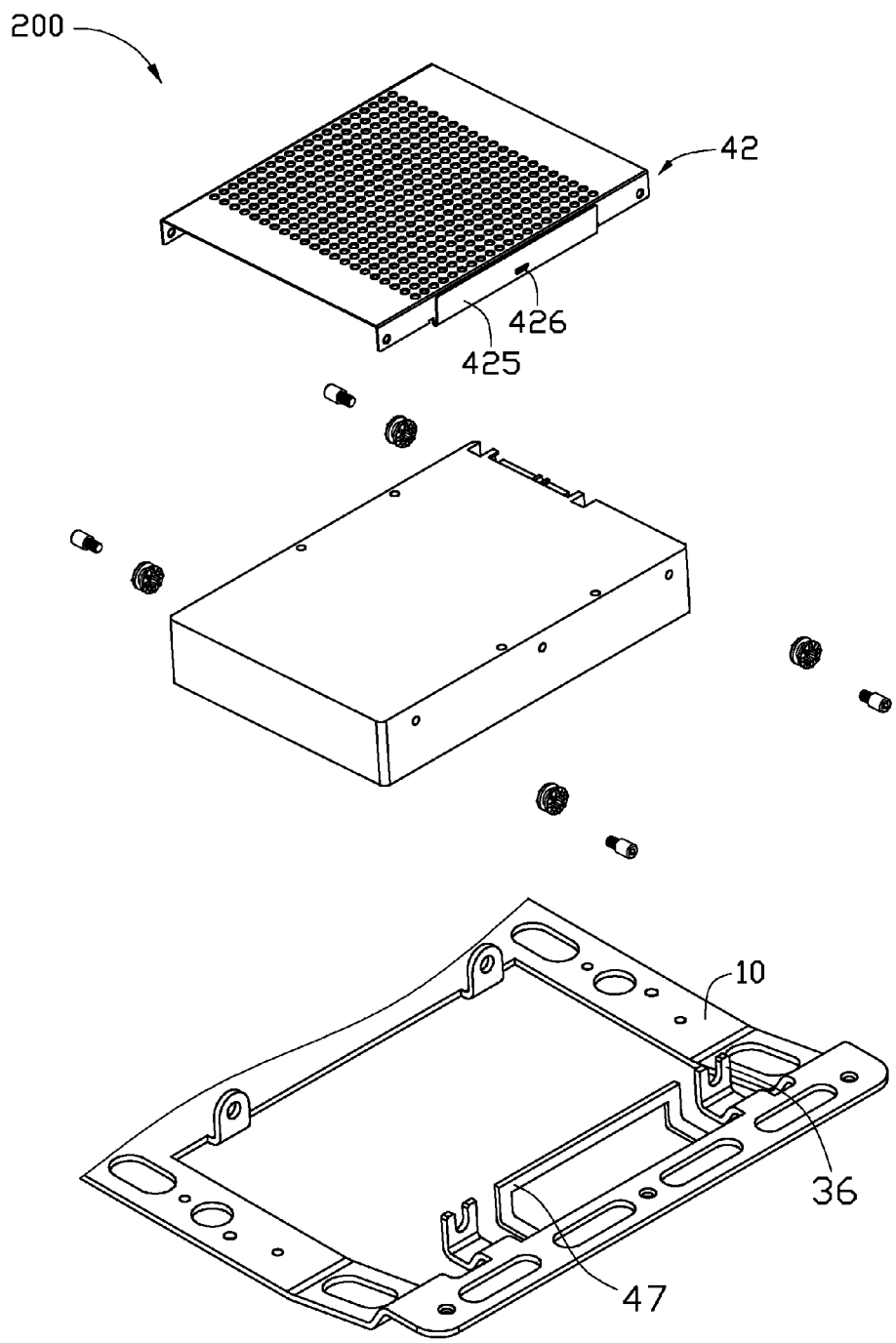
FIG. 5 is an exploded, isometric view of a second embodiment of a fixing mechanism of an electronic device.

Referring to FIG. 5, a second embodiment of an electronic device 200 is similar to the first embodiment of the electronic device 100 in principle, except that the limiting member 42 and the latching member 47 are different from the limiting member 32 and the latching member 37 in the first embodiment. The latching member 47 is substantially U-shaped apart from the two second supporting members 36, and extends out from the bracket 10. The limiting member 42 includes one latching portion 426 formed in a middle portion of the outer surface of the resilient sheet 425.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fixing mechanism fixing a storage device to an electronic device, the electronic device comprising a bracket, the fixing mechanism comprising: a limiting member comprising a resilient sheet and a latching portion extending from an outer surface of the resilient sheet; two first supporting members extending from the bracket; two second supporting members extending from the bracket and corresponding to the two first supporting members; a latching member adjoining the two second supporting members, wherein the latching member is placed on and resisted by the latching portion of the limiting member, such that the latching member engages with the latching portion, and when the resilient sheet deforms toward the inside of the bracket, the latching member detaches from the latching portion; two pairs of fixing members fixing the limiting member to the storage device, wherein one pair of the fixing members is engaged with the two first supporting members, and the other pair of fixing members is engaged with the second supporting member, such that the storage device is mounted between the first and second supporting members, wherein the limiting member further comprises a main board and two side plates, each side plate extends substantially perpendicularly from opposite edges of the main board, and the resilient sheet is fixed to one of the two side plates, wherein the resilient sheet extends from an edge of the side plate and bends substantially parallel thereto.

2. The fixing mechanism of claim 1, wherein the main board defines a plurality of dissipating holes to dissipate heat from the storage device.

3. The fixing mechanism of claim 1, wherein each of the side plates defines two through holes, each through hole defined in opposite ends thereof; the storage device defines two pairs of fixing holes, each pair of fixing holes defined in opposite sides thereof, and the two pairs of fixing members pass through the through holes to engage in the corresponding fixing holes.

4. The fixing mechanism of claim 3, wherein each of the first supporting members defines a through hole and each of the second supporting members defines a latching groove; one pair of fixing members engages in the corresponding through holes and the other pair of fixing members engages in the corresponding latching grooves.

5. The fixing mechanism of claim 4, wherein each of the fixing members comprises a threaded portion and a head portion extending from an end of the threaded portion, and the threaded portions engage in the corresponding fixing holes of the storage device; the head portions of one pair of the fixing members engage in the corresponding through holes of the first supporting members, and the head portions of the other pair of fixing members engage in the corresponding latching grooves of the second supporting member.

6. The fixing mechanism of claim 5, further comprising two pairs of rubber gaskets; one pair of rubber gaskets is sleeved on the corresponding head portions of the fixing members adjoining the second supporting members, and the other pair of rubber gaskets is received in the corresponding through holes of the first supporting members.

7. The fixing mechanism of claim 1, wherein the latching member is a bridge connecting the two second supporting members.

8. The fixing mechanism of claim 1, wherein the latching member is substantially U-shaped and extends out from the bracket.

9. A fixing mechanism fixing a storage device for an electronic device, the fixing mechanism comprising: a bracket comprising two first supporting members, two second supporting members corresponding to the two first supporting members, and a latching member adjoining the two second supporting members; a limiting member comprising a resilient sheet and a latching portion extending from an outer surface of the resilient sheet, wherein the latching member of the bracket is placed on and resisted by the latching portion, such that the latching member engages with the latching portion, and when the resilient sheet deforms toward the inside of the bracket, the latching member detaches from the latching portion; and two pairs of fixing members fixing the limiting member to the storage device; wherein one pair of fixing members engages with the two first supporting members, and the other pair of fixing members engages with the second supporting member, wherein the limiting member further comprises a main board and two side plates, each side plate extends substantially perpendicularly from opposite edges of the main board, and the resilient sheet is fixed to one of the two side plates, wherein the resilient sheet extends from an edge of the side plate and bends substantially parallel thereto.

10. The fixing mechanism of claim 9, wherein the main board defines a plurality of dissipating holes to dissipate heat from the storage device.

11. The fixing mechanism of claim 9, wherein each of the side plates defines two through holes, each through hole defined in opposite ends thereof; the storage device defines two pairs of fixing holes, each pair of fixing holes defined in opposite sides thereof, and the two pairs of fixing members pass through the through holes to engage in the corresponding fixing holes.

12. The fixing mechanism of claim 11, wherein each of the first supporting members defines a through hole and each of the second supporting members defines a latching groove, and one pair of fixing members engages in the corresponding through holes and the other pair of fixing members engages in the corresponding latching grooves.

13. The fixing mechanism of claim 12, wherein each of the fixing member comprises a threaded portion and a head portion extending from an end of the threaded portion, and the threaded portions engage in the corresponding fixing holes of the storage device; the head portions of one pair of the fixing members engages in the corresponding through holes of the first supporting members, and the head portions of the other pair of fixing members engage in the corresponding latching grooves of the second supporting member.

14. The fixing mechanism of claim 13, further comprising two pairs of rubber gaskets; one pair of rubber gaskets is sleeved on the corresponding head portions of the fixing members adjoining the second supporting members, and the other pair of rubber gaskets is received in the corresponding through holes of the first supporting members.

15. The fixing mechanism of claim 9, wherein the latching member is a bridge connecting the two second supporting members.

16. The fixing mechanism of claim 9, wherein the latching member is substantially U-shaped and extends out from the bracket.

* * * * *